Feb. 24, 1953 B. R. CARSON 2,629,603

AUTOMATIC RECORD CHANGER

Filed Feb. 11, 1948 7 Sheets-Sheet 1

Inventor

Benjamin R. Carson

By

Philip[illegible] Cooper

Attorney

Inventor
Benjamin R. Carson
By Philip H. Cooper
Attorney

Feb. 24, 1953 B. R. CARSON 2,629,603
AUTOMATIC RECORD CHANGER
Filed Feb. 11, 1948 7 Sheets-Sheet 3

Inventor
Benjamin R. Carson
By Philip H. Cooper
Attorney

Feb. 24, 1953 B. R. CARSON 2,629,603

AUTOMATIC RECORD CHANGER

Filed Feb. 11, 1948 7 Sheets-Sheet 4

Inventor

Benjamin R. Carson

By Philip G. Cooper

Attorney

Feb. 24, 1953 B. R. CARSON 2,629,603

AUTOMATIC RECORD CHANGER

Filed Feb. 11, 1948 7 Sheets-Sheet 5

Inventor

Benjamin R. Carson

By Philip G. Cooper

Attorney

Feb. 24, 1953 B. R. CARSON 2,629,603

AUTOMATIC RECORD CHANGER

Filed Feb. 11, 1948 7 Sheets-Sheet 6

Inventor

Benjamin R. Carson

By Philip M. Cooper

Attorney

Feb. 24, 1953 B. R. CARSON 2,629,603

AUTOMATIC RECORD CHANGER

Filed Feb. 11, 1948 7 Sheets-Sheet 7

INVENTOR
Benjamin R. Carson
BY Philip G. Cooper
ATTORNEY

Patented Feb. 24, 1953 2,629,603

UNITED STATES PATENT OFFICE 2,629,603

AUTOMATIC RECORD CHANGER

Benjamin R. Carson, Haddonfield, N. J., assignor to Radio Corporation of America, a corporation of Delaware Application February 11, 1948, Serial No. 7,610

3 Claims. (Cl. 274—10)

This invention pertains to phonographs, and more particularly to a phonograph utilizing an automatic record changer of the type which may have a plurality of records supported by a magazine wherein the records are sequentially deposited onto a turntable for playing. The automatic phonograph of the present invention employs a drop type automatic record changer utilizing an offset spindle of the type set forth in the patent application of Alexander D. Burt, filed November 23, 1946, Serial No. 711,983, now Patent Number 2,579,999, for a Phonograph Turntable Spindle, which application is assigned to Radio Corporation of America.

It is a primary object of the invention to provide a record changer mechanism of the class set forth wherein the record changing functions are performed by a mechanism having a minimum number of parts which provide maximum efficiency in operation, with certain of the mechanical elements of the mechanism being compactly mounted on a sub-assembly base.

Another object of the present invention is to provide an improved phonograph of the type specified, which wil lincorporate simplified record supporting and record releasing structure.

A further object of the invention is to provide a comprehensive and efficient record changing mechanism having a unitary record ejector head adaptable for use with either 10 or 12 inch records and having automatic means for presenting the proper portion of a rotatable ejector head to the record upon suitable positioning of the record supporting magazine for the particular dimension records desired to be played.

A further object of the invention is to provide a novel record changing cycle initiating and terminating means employing a cam having a resilient camming surface for engagement with the turntable driving means during operation of the record changing mechanism.

A further object of the invention is to provide a record ejector safety mechanism which will prevent jamming of the record changing mechanism due to a possible fouling of the record ejector head caused by damaged or generally unsuitable records.

A further object of the invention is to provide a novel variable position record supporting magazine employing a rotatable record ejector head and having an automatically adjustable mechanism associated therewith to permit movement of the magazine for use with records of different dimensions, and for simultaneously positioning the proper surface of the record ejector head for presentation to the particular dimension record.

Other objects of the invention include ease of assembly, economy of manufacture, and simplicity in adjustment, as well as further objects which may become apparent from a perusal of the following description taken in conjunction with the drawings.

While specific details of the invention are presented herein, it is to be understood that they are by way of illustration and that other changes and modification may be made without departing from the spirit of the sub-joined claims.

In the drawings:

Fig. 9 has similar parts as shown in Fig. 8, just after the record changing mechanism has been initiated by movement of the tone arm sound reproducing instrumentality in the record eccentric terminal groove but before the parts have moved out of their immobilized position;

Figure 9:
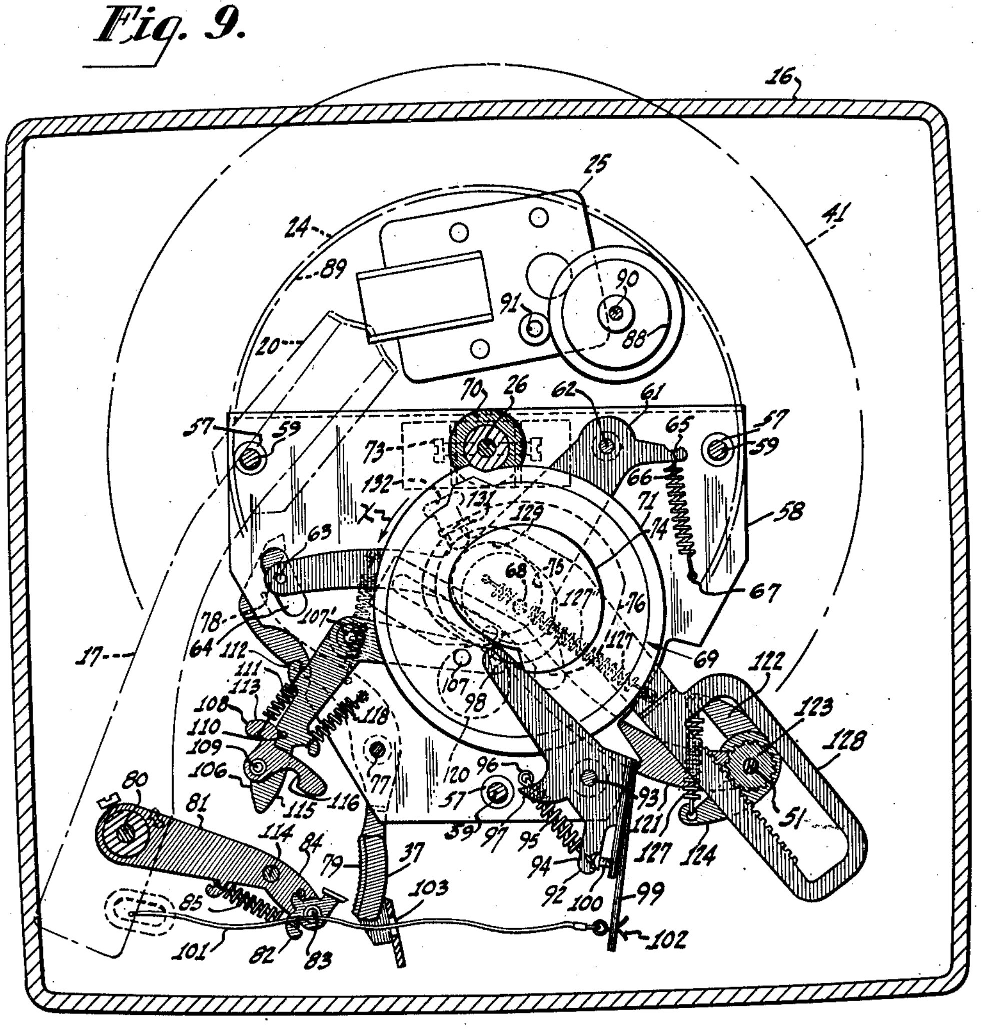
Figure 10:
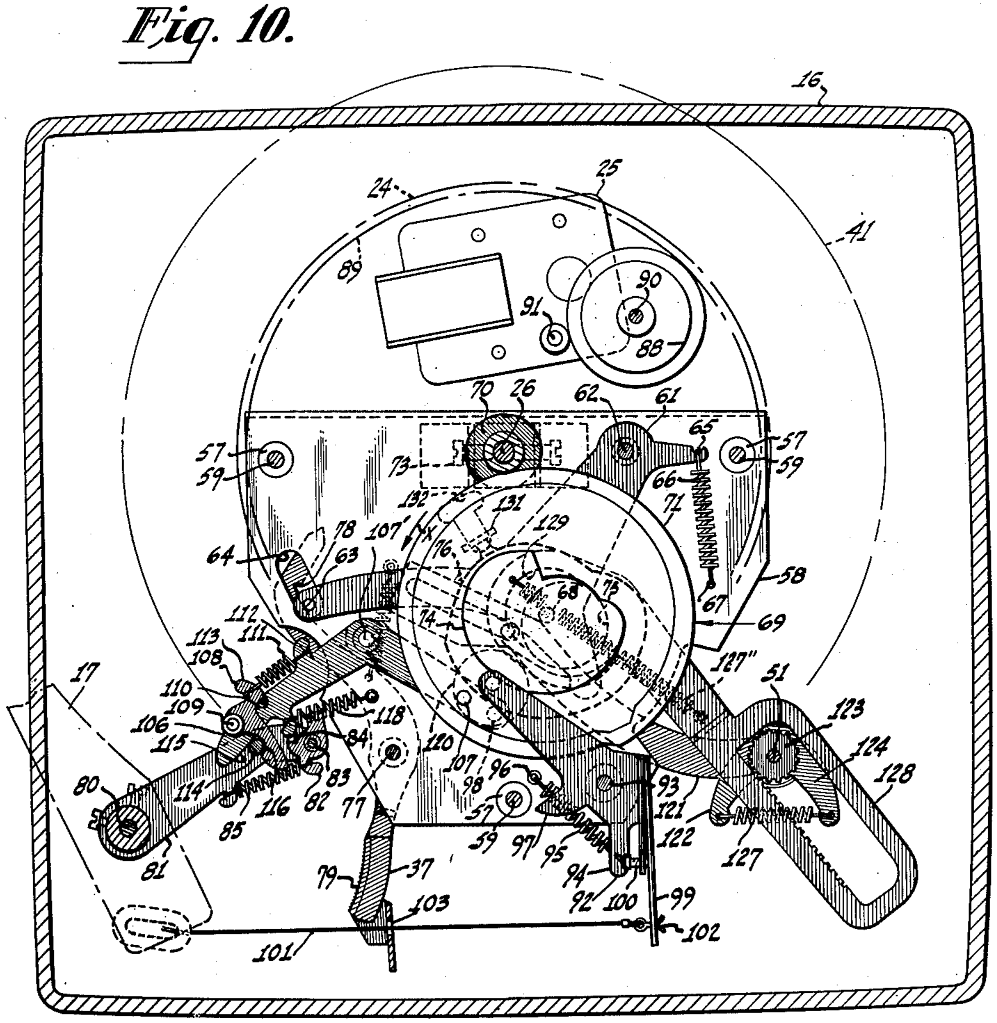
Figure 11:
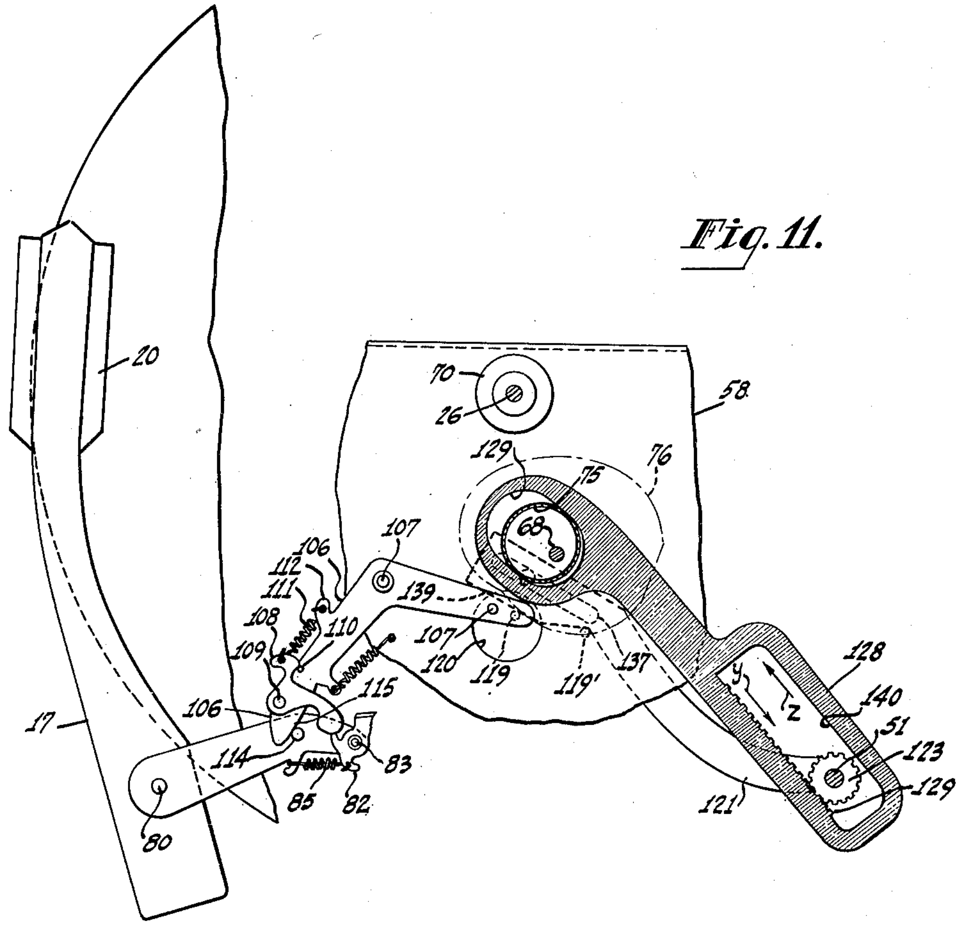

Fig. 10 shows similar parts of Fig. 9 with the record ejector mechanism positioned at the moment when the record ejector head has been rotated to urge the lowermost record in the magazine stack for deposition onto the turntable and the tone arm is momentarily latched in its outermost position prior to being restored to its landing position; and Fig. 11 shows the relative position of the record ejector rack lever positioned for 12 inch records, with the landing lever shown dotted below the sub-assembly base in conjunction with the tone arm return lever.

Accordingly, the present invention contemplates an automatic phonograph employing a record changer of the type wherein a plurality of records are supported adjacent their centers upon a shoulder on a spindle and adjacent their peripheries upon a support member at one side of the turntable. Periodically, at the completion of the playing of one record, the lowermost record of the stack on the spindle is automatically shifted laterally off of the spindle shoulder to free it from the stack so that it can slide down along the spindle to be deposited on the turntable. A unitary record ejector head adapted to be used with records of different thicknesses, as would occur when used with 10 inch and 12 inch records, is rotatably mounted in a magazine for individually engaging and releasing the records from the stack. A safety mechanism is used in the ejector head drive motion to prevent jamming of the record changer mechanism due to the fouling of the record ejector head caused by a damaged or otherwise unsuitable record.

Further, the invention utilizes a gear-lever arrangement associated with the rotatable ejector head so that the proper portion of the ejector head is automatically positioned for presentation to the particular dimension record upon movement of the magazine when changing from one position to another position for use with records of different dimensions. The record changing and tone arm positioning mechanism operates automatically in cycles, each cycle beginning at the conclusion of the playing of each record. A master cam disc pivotally mounted on a sub-assembly base rotates throughout a record changing cycle, the cam disc carrying a cycling cam, a cable lever cam, a rack lever cam, and a return lever cam, with each of the cams having complemental mechanical elements associated therewith to perform the desired record changing and tone arm positioning functions in predetermined timed relation.

Figure 1:
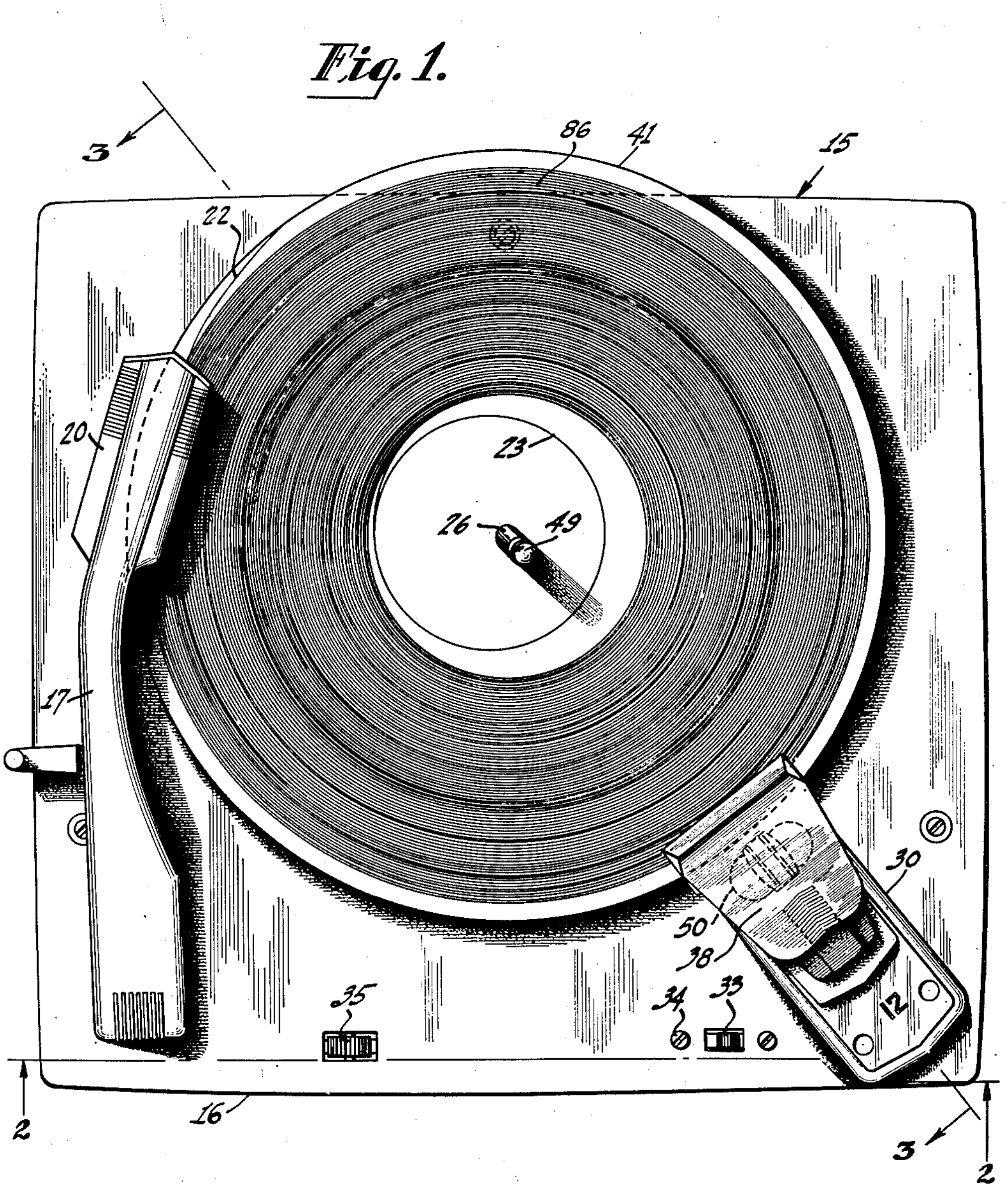
Fig. 1 is a plan view of the invention showing the general arrangement of the tone arm and the record support magazine in relation to a record disposed on a turntable.
Figure 2:
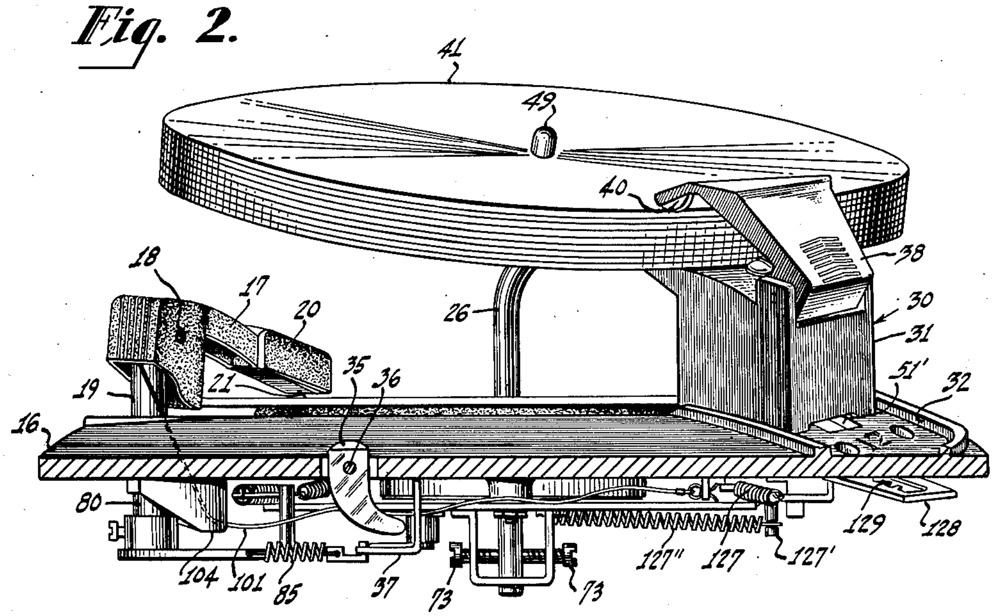
Fig. 2 is a sectional view taken along lines 2—2 of Fig. 1 showing arrangement of certain of the parts which are disposed below the phonograph motor board.
Figure 3:
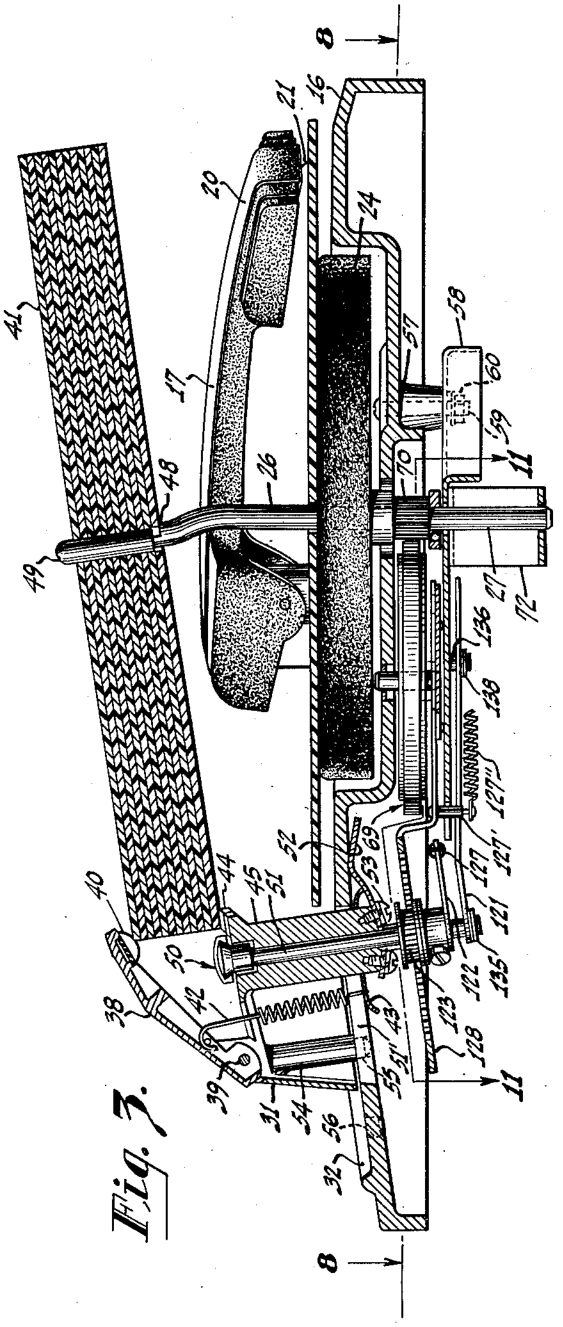
Fig. 3 is a sectional view taken along lines 3—3 of Fig. 1 showing the arrangement of parts in the record support magazine and certain parts of the record changing mechanism.

Referring to the drawings, and more particularly to Figs. 1, 2, and 3, there is shown an automatic phonograph 15, including a motor board 16 having mounted thereon a tone arm 17 which is pivotally connected by a pin 18 to permit raising and lowering of the tone arm on the post 19, which post is rotatably mounted on the motor board 16 to permit lateral motion of the tone arm when the sound reproducing instrumentality 20 moves in response to the needle traversing the sound groove, the lead-in groove 22, or the terminal groove 23, or being otherwise responsive to the record changing mechanism.

The motor board 16 has a turntable 24 which is mounted thereon in a conventional manner to be driven by an electrical motor 25 preferably of the synchronous type to assure a constant rotational speed of the turntable. A spindle 26, of the class set forth hereinbefore, has an elongated shaft portion 27 which extends downwardly through a centrally formed opening in the turntable 24, the turntable being freely movable for rotation about the stationary spindle 26, the elongated straight portion 27 of the spindle 26 being fixedly held in a predetermined position.

A motor starting switch 33 is disposed on the upper surface of the motor board 16, and held in place by screws 34. A reject, or cycle-starting lever 35 is pivoted by a pin 36 to the motor board 16, with one portion of the lever protruding above the motor board to permit manipulation thereof, while the lower portion of the reject lever protrudes below the surface of the motor board to engage a ratchet lever 37 for initiating a record changing cycle, which operation will be more fully described in connection with the record changing mechanism.

*Record supporting magazine*

A record support magazine 30 has a body position 31 which is slidably mounted between guide members 32 to permit the magazine 30 to be moved to and fro along the guide means to adapt the machine for use with either 10 inch or 12 inch records.

A magazine record clamp 38 is pivoted to the body portion 31 of the magazine 30 by means of a pin 39, with the free end of the record clamp 38 having a rubber member 40 which engages a portion of the upper surface of the top record of the record stack 41 adjacent the outer peripheral edge thereof. The record clamp 38 has a spring 42 which connects the record clamp to the slidable anchor plate 43 located below the motor board to urge the clamp against the upper-most record in the stack and also to assist in retaining the magazine in position, said plate being movable with the magazine 30. The spring 42 urges the record clamp downwardly so that the records 41 are clamped between the rubber member 40 and the shoulder 44, said shoulder being a part of the upper portion of the stanchion 45 of the magazine, and engages a portion adjacent the lower peripheral edge of the lowermost record in the stack. The spindle 26 which receives the records through their respective central apertures, has a shoulder 48 on which the lowermost record of the stack of unplayed records can rest, with the remainder of the stacked records being concentrically aligned on the stack detaining member 49 which is movably connected to the spindle 26, as set forth in the application referred to hereinbefore.

Normally, the records to be played are disposed on the upper portion of the spindle with the center opening of the records being aligned on the stack detaining member 49, while a portion of the peripheral edges of the upper and lower records of the stack are gripped, respectively, between the rubber member 40 and shoulder 44 of the magazine to hold the records in a ready releasable position. Included in the record changing mechanism, later to be set forth in detail, the record ejector head 50 which is pivotally mounted on the ejector shaft 51 will be rotated substantially ninety degrees, so that one portion of the record ejector head will engage the edge of the lowermost record thereby urging the peripheral edge of the center opening in the lowermost record off of the shoulder 48, thus carrying the record beyond the supporting and holding influence of the magazine. The lowermost record is then released from the shoulder 48 on the spingle 26, and is free to be dropped along the spindle and guided thereby onto playing position on the turntable 24.

The magazine 30 has a lower portion of the stanchion 45 disposed in a slot 51' formed in the motor board along which the stanchion may be moved to position the magazine for use with different dimensions records, such as 10 inch and 12 inch records. A clamp plate 52 is secured to the lower portion of the stanchion 45 by screws 53, with the clamp plate being shaped to engage and slide on the underneath surface of the motor board to facilitate movement of the magazine which requires a tilting motion thereof to free the lower portion of the magazine positioning studs 54 from their complemental openings 55 in the motor board and in holding the magazine in the desired position on the motor board.

Studs 54 protrude sufficiently below the body portion of the magazine as shown in Fig. 3, to engage their position retaining openings in the motor board on either side of the slot 51' when the magazine is in position for playing 10 inch records. When the magazine is moved outwardly from the spindle on the motor board so that the lower portion of the studs 54 may engage the openings 56, the magazine will be in position for receiving 12 inch records to be played.

The slidable anchor plate 43 has an opening therein to movably fit around the lower portion of the stanchion 45 and permit the anchor plate to be freely movable with the stanchion.

Figure 5:
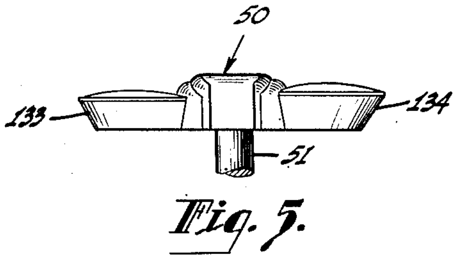
Fig. 5 is a side view of the record ejector head showing one portion thereof adapted for use with 10 inch records and an opposing portion adapted for use with 12 inch records.

The enlarged view of the record ejector head 50, shown in Fig. 5, taken in conjunction with the showing in Figs. 1 and 3 shows a unitary multi-faced ejector head secured to the ejector shaft 51.

It will be seen that the magazine is freely movable on the motor board to receive either 10 inch or 12 inch records. The magazine is securely held in either the 10 inch or the 12 inch position, while the proper face of the record ejector head 50 will, normally, be positioned for engaging the outer peripheral edge of the lowermost record when a stack of either 10 inch or 12 inch records is in playing position on the phonograph.

*Master cam disc and cycling cam operation*

In general, the master cam disc carries a cycling cam for operation in initiating and terminating the record changing cycle, a cable lever cam for partially controlling movement of the tone arm, a return lever cam for operation in returning the tone arm to its approximate landing position, and a rack lever cam for operation in conjunction with the mechanism for performing the record changing function. See Figs. 8 to 10.

The main supporting structure of the phonograph which includes the motor board 16, has a plurality of bosses 57 molded on the underneath surface thereof for supporting a sub-assembly base 58 in spacial relation to the underneath surface of the motor board. Headed screws 59 protrude through the motor board and the bosses to secure thereon the sub-assembly base 58, the sub-assembly base being held in position on its supporting screws by means of nuts 60. A cam plate 61 is pivotally secured to the sub-assembly base by means of a pin 62. A cam plate pin 63 is secured to one arm of said cam plate and protrudes through a slot 64 to the underneath side of the sub-assembly base. A cam plate protuberance 65 extends from the cam plate 61 and has one end of a spring 66 connected thereon with the opposing end of the spring being connected to a pin 67, which pin is secured on the sub-assembly base. A cam plate stud 68 is secured to the cam plate, and the master cam disc 69 is revolvably mounted thereon. A cam disc drive wheel or hub 70 having a knurled surface is secured to the underneath surface of the turntable and is rotatable therewith about the stationary spindle 26 to engage the cycling cam 71 which is in fact a rubber time member disposed on the outer peripheral edge of the master cam to provide a cam-shaped driven surface including a relatively abrupt surface portion to carry the cycling cam into latched connection with the latching elements at about the end of a record changing cycle and to assure suitable frictional engagement between the cycling cam 71 and the cam disc drive wheel or hub 70, to drive said cycling cam throughout the record changing cycle. The elongated straight portion 27 of the spindle 26 protrudes through a spindle support 72 and is held stationary by means of screws 73 which are connected through the spindle support, and grip the outer surface of the elongated straight portion 27, steadying the spindle during the record changing cycle, as well as locking the spindle in fixed relation to the motor board while the turntable may rotate thereabout.

The master cam disc 69 carries on the upper surface thereof a cable lever cam 74, and carries on the bottom surface thereof a rack cam lever 75 and a return lever cam 76, and carries on the outer peripheral edge thereof the cycling cam 71. Engagement of the cycling cam 71 with the cam disc drive wheel 70 carried by the turntable, will cause all four of said cams carried by the master cam disc 69 to be simultaneously rotated in the direction of the arrow "X," thus initiating the record changing cycle under influence of the cam plate spring 66, urging the cam plate 61 clockwise on its pivot pin 62.

Figure 7:
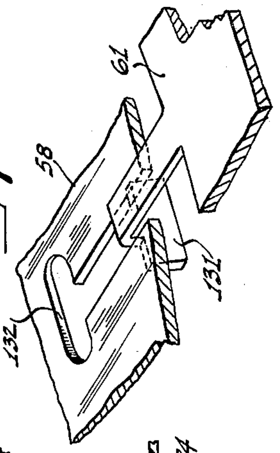
Fig. 7 is a perspective view partially broken away showing one partial form of the master cam plate movable positioning means in relation to the sub-assembly base.

The cam plate 61 has a means for being held in close relation to the sub assembly base in the area of the stud 68 which is secured to the cam plate, and upon which stud the master cam disc 69 is mounted. The cam plate holding means shown specifically in Fig. 7, includes a shoulder 131 formed integrally as part of the cam plate 61, which shoulder is insertable during the assembly of the invention through the T shaped slot 132 formed in the sub assembly base. The shoulder 131, when properly assembled, will engage the underneath surface of the sub assembly base, but be movable thereagainst. The holding action provided between the shoulder 131 and the sub assembly base in the area of the T shaped slot will tend to assist in maintaining the cam plate 61 in the desired plane. Without the cam plate holding means there may be a tendency for undue friction to be created between the moving parts.

The ratchet lever 37 is disposed below the sub assembly base 58 and is pivotally connected thereto by a pin 77. One end of the ratchet lever 37 has a notch 78 which engages the cam plate pin 63 to hold the cycling cam 71 out of engagement with the cam drive wheel 70 thereby immobilizing operation of the record changer mechanism. The opposite end of the ratchet lever 37 has an arcuate toothed latch plate 79, secured thereon. The tone arm 17 is secured to the rotatable shaft 80 which protrudes through the motor board and has a trip lever 81 secured thereon. A trip lever pawl 82 is pivotally connected to the trip lever 81 by a pin 83. A stop pin 84 engages a protuberance of the trip lever pawl to limit the movement of the trip lever pawl in one direction under influence of the trip lever spring 85.

Figure 8:
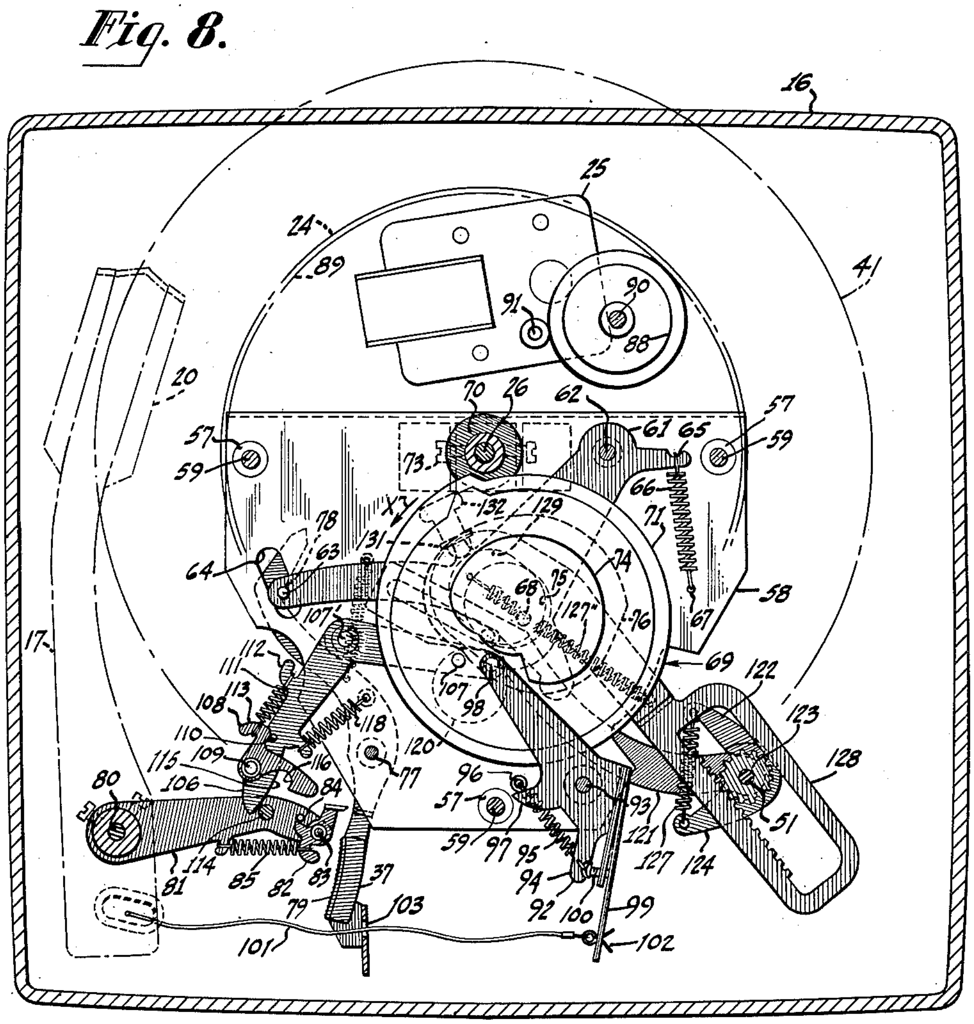
Fig. 8 is a top view of the record changing mechanism immobilized, with the motor board per se, removed, and the tone arm, shown dotted, in its index position for playing 10 inch records.

In normal operation, assuming the tone arm is at its landing position as shown in Fig. 8, the needle 21 carried by the sound reproducing instrumentality 20, will follow from the lead-in groove 22 into the sound groove 86 of the record. The inward motion of the sound reproducing instrumentality will cause the pawl 82 to be moved into engagement with the toothed latch plate 79. The pressure of the cam plate 61 under influence of the cam plate spring 66, which is connected to the pin 67 secured in the sub-assembly base, will keep the cam plate pin 63 in the notch 78 of the ratchet lever 37. As long as the sound reproducing instrumentality is moving inwardly following the sound groove 86, the pawl 82 will engage and ride over the surface of the toothed latch plate 79. When the needle of the sound reproducing instrumentality engages the eccentric terminal groove 23, the tone arm will be caused to oscillate laterally. The outward lateral motion of the tone arm will cause the knife edge of the pawl 82 to bind against one of the teeth on the latch plate 79 to swing the pawl 82 clockwise and have its motion limited by the stop pin 84. The pressure of the pawl 82 against the latch plate 79, due to the outward lateral motion of the tone arm, will cause the ratchet lever 37 to be kicked away from the pawl, thereby causing the cam plate pin 63 to disengage the notch 78, thereby permitting the cam plate spring 66 to urge the cycling cam 71 of the master cam disc 69 into engagement with the cam disc drive wheel 70 to initiate operation of the record changing cycle, while the turntable is rotating.

The rotation of the turntable 24 is caused by the rubber tired turntable drive wheel 88, rotatable on a pin 90 secured to the motor board, which turntable drive wheel engages the inside rim 89 of the turntable 24, under influence of the motor 25 which has its shaft drive wheel 91 likewise engaging the turntable drive wheel 88. It will therefore be seen that the movement of the tone arm caused by the needle of the sound reproducing instrumentality laterally oscillating in the record terminal groove will cause the ratchet lever to release the cam plate pin from the ratchet lever notch and initiate the record changing cycle.

The automatic initiating of the record changing cycle has been set forth above. However, the record changing cycle may be initiated manually by proper manipulation of the reject lever 35 (Fig. 1) which reject lever may perform the same function as the trip lever pawl 82 to disengage the ratchet lever notch 78 from the cam plate pin 63.

*Cable lever cam operation*

The cable lever cam 74 which partially controls movement of the tone arm 17, cooperates with a cable lever 92 which is mounted on a pin 93 secured to the sub assembly base. A protuberance 94 on the cable lever has a spring 95 connected thereto at one end thereof, with the other end of the spring connected to a stop pin 96 which engages the shoulder 97 on the cable lever. A cable lever cam follower 98 is secured to the elongated arm of the cable lever 92 to ride on the camming surface of the cable lever cam 74. A metallic spring 99 is secured to the cable lever as shown at one end thereof and has an adjustment screw 100 which is threadedly connected through a portion of the cable lever to place the desired tension upon the spring 99. A cable 101 is connected to the free end of the spring 99 in any convenient manner, such as by the loop headed pin 102. The cable 101 is passed through the opening 103 of the ratchet lever 37 and extends over the shoulder 104 with the free end of the cable being secured to the tone arm in a suitable or conventional manner so that the tension on the cable will cause the tone arm sound reproducing instrumentality to be raised from the eccentric terminal groove and swung outwardly free of the path of the lowermost record of the stack which is to be deposited in playing position upon the turntable. The shape of the cable lever cam in conjunction with its associated mechanical elements is such that the cable lever cam follower will be urged against the cable lever cam under the influence of the spring 95 so that rotation of the cable lever cam will properly tension the cable lever in timed relation during the record changing cycle so that the tone arm will be sufficiently elevated from the record to be swung outwardly out of the path of the lowermost record to be deposited on the turntable. The cable reflects sufficient tensional loading to insure satisfactory landing of the sound reproducing instrumentality at the lead-in groove of the next record to be played.

*Return lever cam operation*

The return lever cam 76 operates in returning the tone arm 17 to its approximate landing position and cooperates with the return lever 106 which is pivotally mounted on a pin 107' secured to the sub-assembly base. The pin 107, secured adjacent the inner end of the return lever 106, is disposed upwardly to act as a return lever cam follower and engage the return lever cam 76 located on the underneath surface of the master cam disc 69. The opposing end of the return lever 106 has a return lever latch 108 pivotally connected to the return lever by a pin 109 which is secured to the return lever. A stop pin 110, secured to the return lever, limits the movement of the return lever latch in one direction under influence of the spring 111, the opposing ends of which are connected to a protuberance 112, of the return lever and a protuberance 113 of the return lever latch 108. After the tone arm has been moved from the position shown in Fig. 8, across the toothed latch plate 79 of the ratchet lever 37, the lateral oscillatory movement of the tone arm sound reproducing instrumentality following the eccentric terminal groove will have caused the ratchet lever to assume the position shown in Fig. 9. The rotation of the cable lever cam will cause the cable 101 to swing the tone arm upwardly and outwardly, thereby causing the trip lever pin 114, secured to the trip lever 81, to engage the surface 115 of the return lever 106, urging the return lever into the position shown in Fig. 10, wherein the notch 116 of the return lever latch 108 will hold the trip lever pin 114 against the surface 115 of the return lever and momentarily stop the tone arm to avoid rebound thereof, thereby keeping the tone arm under influence of the return lever 106 for proper tone arm landing position. Rotation of the return lever cam 76 will permit the latch end of the return lever 106 to swing counter-clockwise on its pivot pin 107' under the influence of spring 118, which urges the surface 115 of the return lever into engagement with the trip lever pin 114, thereby causing the tone arm to be swung inwardly toward the landing position. The exact landing position of the tone arm is determined by a pin 119 (Fig. 11) engaging the locating lever 121, which will be more fully explained hereinafter in relation to the landing position for 10 inch and 12 inch records. From the above it will be seen that the return lever cam follower will engage the return lever cam to bring the tone arm into its approximate landing position while the return lever pin 119 in engagement with the locating lever 121 will determine the exact landing position, which will naturally be different depending upon whether or not the invention is set for use with 10 inch or 12 inch records.

*Rack lever cam operation*

Figure 4:
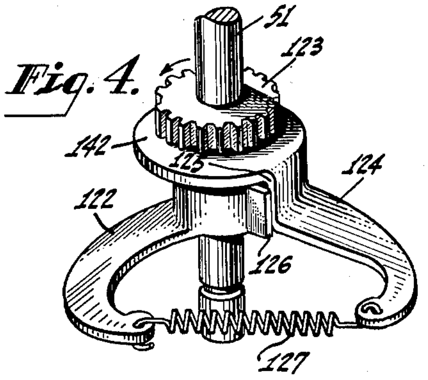
Fig. 4 is a perspective view of the safety mechanism connected to the shaft of the unitary record ejector head.
Figure 6:
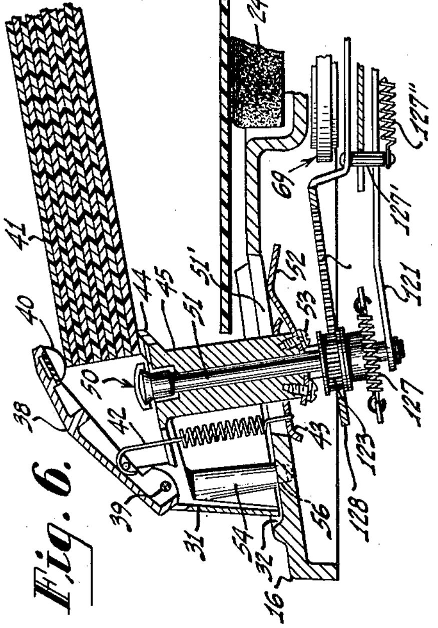
Fig. 6 is an enlarged sectional view of the record changer magazine with certain of the ejector mechanism parts in position for use with 12 inch records.

The rack lever cam 75 operates in conjunction with the mechanism for carrying out the actual record changing function. The mechanism for the rack lever cam operation is particularly shown in Figs. 4, 6, and 11, wherein the ejector shaft 51 is inserted through the opening of the stanchion 45. The record ejector head 50 is secured to one end of the shaft and positioned for engaging the lowermost record of the stack of records disposed on the magazine. A safety mechanism has an ejector shaft lever 122 secured to the lower portion of the ejector shaft 51, and a safety lever 124 carrying a gear 123 and freely movable on the ejector shaft. A shoulder 125 formed by bending a portion of the safety lever engages a protuberance 126 which is integral with the ejector shaft lever 122. A safety spring 127 connects together the free ends of the ejector shaft lever and the safety lever, 122 and 124 respectively, so that the protuberance 126 and the shoulder 125 are normally in engagement with one another. A rack lever 128 has an elongated slot therein adjacent one end, with a rack 129 formed in the slot. A rack lever cam follower 129′ is formed by an elongated slot in the opposing end of the rack lever and is adapted to cause the rack lever to move to and fro in response to the rotary motion of the rack lever cam 75 due to rotation of the master cam disc about the stud 68 during the record changing cycle. A stud 127′ is secured to the rack lever 128 with one end of the stud protruding below the locating lever 121. A spring 127″ has one end connected to the stud 127′ with the opposite end of the spring being connected to the subassembly base to normally hold the rack lever cam follower portion 129 in engagement with the rack lever cam 75. Since the ejector shaft 51 is carried by the magazine 30, and said ejector shaft is rotatable in said magazine, it will be seen that movement of the rack lever 128, in response to the cam follower 129′ engaging the rack lever cam 75, will cause the gear 123 to be rotated by said rack. The movement of the rack 129 will cause the gear 123 to be rotated in a counter-clockwise direction when the rack lever moves in the direction of the arrow "Y" (see Fig. 11) in the initial movement of the record changing cycle. The ejector shaft lever 122 and the safety lever 124 which are positively coupled under action of the spring 127, will cause the ejector shaft to be rotated.

The rack gear 123 which engages the rack 129 rides in the slot of the rack lever 128, which slot is of sufficient width to permit the rack gear 123 to be inserted therein and have the straight edged portion 140 of the rack lever slot act as a guide means to keep the gear in engagement with the rack 129 by limiting lateral motion of the gear 123 away from the rack. A guide means to prevent disengagement of the gear 123 from the rack 129 due to vertical motion of the rack lever 128, comprises a collar 142 formed as a part of the safety lever 124, and a washer 141, which is movably positioned contiguous with the upper surface of the gear 123 and held in position by the lower portion of the stanchion 45.

The characteristics of the particular mechanical elements involved are such that substantially a 90 degree counter-clockwise rotation of the ejector shaft will cause the ejector head to be rotated to release the lowermost record from the stack to be deposited on the turntable.

Continued rotation of the rack lever cam during the record changing cycle will thereafter cause the rack lever 128 to move in the opposite direction as indicated by the arrow "Z" in Fig. 11. The rack 129 will then rotate the ejector head 50, through the medium of the safety mechanism, substantially 90 degrees in a clockwise direction, thereby restoring the record ejector head to its original inactive position, the ejector head, thereafter, will remain stationary during the remainder of the particular record changing cycle.

During the operation of the rack lever, the cable lever operation will have caused the tone arm to move beyond the confines of the particular dimension record to be deposited on the turntable so that the record releasing function involving the rack lever will have been properly performed.

*Locating lever operation*

The purpose of the locating lever is to provide means, in cooperation with other mechanical elements of the record changing mechanism, to determine the exact landing position of the tone arm sound reproducing instrumentality when the invention is adapted for use with different dimension records, for example 10 inch and 12 inch records. Attention is particularly directed to Figs. 3 and 11, wherein the locating lever 121 is disposed below the sub assembly base. One end of the locating lever 121 is pivotally mounted adjacent the lower end of the ejector shaft 51 and is suitably held thereon by any convenient means, such as the clip-washer 135. A stud 136 is secured to the sub assembly base and protrudes downwardly therefrom to pass through the slot 137 which is formed in the locating lever 121. A clip-washer 138 holds the locating lever 121 in operable position on the stud 136. The return lever 106 has a pin 119 secured thereto, which pin protrudes downwardly through the hole 120 which is formed in the sub assembly base. The pin 119 is disposed to engage the return lever 121 either on the straight portion 139 when the device is set to play 12 inch records, or to engage the locating lever 121 in the assumed dotted position, shown as pin 119′ in Fig. 11. It is to be understood that pin 119 and 119′ (shown dotted) are both the same pin, but the dotted pin 119′ represents only the relative position of the pin 119 in relation to the particular portion of the return lever 121, when the device is set to play 10 inch records, and the locating lever is accordingly moved and properly positioned to engage pin 119′ as would be the case as shown in Fig. 10.

The locating lever operation and the return lever operation are complemental in that the return lever cam is so configured that during the record changing cycle, the rotation of the return lever cam will have its cam follower pin 107 bring the return lever back and carry the tone arm into approximate landing position under the action of the return lever spring 118. As the return lever pin 119 engages the particular portion of the locating lever 121, the inward movement of the tone arm will cease, thereby fixing the desired landing position, depending on the position of the locating lever as determined by the location of the magazine.

Summarily, from the foregoing, it will be seen that the sub assembly base carries the movable cam plate which has pivotally mounted thereon the master cam disc, which cam disc in turn supports the cycling cam, the return lever cam, the rack lever cam, and the cable lever cam. The sub assembly base also supports all of the operating levers associated with the cams carried by the master cam disc, as well as supporting the locating lever.

Facility in assembly of the automatic phonograph mechanism is had by properly mounting the required mechanical elements on the sub assembly base, and readily securing said sub assembly to the underneath side of the motor board. The tone arm cable and the magazine associated levers are then operatively connected to control the tone arm and record changer mechanism per se in timed relation to the overall operation of the apparatus of the invention.

The unitary record ejector head has two opposing portions which are automatically rotated in operative position by movement of the magazine on the motor board to receive either 10 inch or 12 inch records. One portion 133 of the ejector head has its upper surface adapted for 10 inch records and is on a level below the upper surface of the opposing portion 134 of the ejector head which is adapted for 12 inch records, since the 12 inch records are normally thicker than the 10 inch records in generally accepted manufacturing practice. This difference of dimension in thickness of records, combined with the commercial practice of different contour peripheral edges of records is realized in the novel configuration of the ejector head of the present invention. The upper surface of the ejector head portions are convex to permit suitable slicing action of the desired portion of the ejector head so that when the ejector head is rotated to release the lowermost record from the stack, the upper convex surface of the ejector head will slide under and momentarily support the next record of the stack to be disposed in ready releasing position in the magazine. The inclined sides and ends of the ejector head portions are configured to engage the peripheral edge of the lowermost record and tend to apply pressure downwardly as well as laterally, thereby providing a slicing action to assure engagement of the desired ejector head portion with only the lowermost record.

The safety mechanism in the record releasing operation employs a spring member to rotate the ejector head shaft in response to operation of the rack lever. If the record ejector head engages the edge of a damaged record, or engages more than one record of unsuitable thickness, or for any other reason jams and prevents the ejector head from normal rotation, the rack lever operation will cause the spring member of the safety mechanism to expand and permit the record changing cycle to be completed without damaging the elements of the mechanism.

What is claimed is:

1. In a phonograph of the class described having a motor driven turntable, a tone arm having a sound reproducing instrumentality, and a record support magazine for holding the records prior to their individual positioning on the turntable; a record changing mechanism comprising, a frame for supporting said mechanism, a master cam plate pivotally mounted on said frame, a master cam disc rotatably mounted on said cam plate, a drive wheel secured to said turntable for engagement with the outer peripheral edge of said master cam disc, a ratchet lever having a notch therein adjacent one end and a toothed latch plate adjacent the other end thereof pivotally mounted on said frame, a cam plate pin secured to said cam plate for engagement with said ratchet lever notch to latch and hold said master cam disc from engagement with said drive wheel thereby immobilizing said record changing mechanism, spring means for urging said rotatable master cam disc into engagement with said drive wheel when said ratchet lever notch is out of engagement with said cam plate pin, and means responsive to the termination of a recording for disengaging said cam plate pin from said ratchet lever notch to initiate operation of said record changing mechanism.

2. In an automatic record-changing phonograph apparatus having a rotatable turntable and pick-up elements for sequentially reproducing the recordings on individual phonograph records: record changing mechanism including a friction driving hub connected for rotation with the turntable, and a friction cycling cam disc having a cam-shaped driven surface biased toward frictional engagement with the driving hub during a record changing cycle, and connected to effect the record changing operation; latch elements connected to hold the cycling disc out of engagement with the driving hub during a record reproducing operation, and also connected to be tripped at the end of a record reproducing operation to release the cycling disc for biased engagement with the driving hub; said cam surface including a relatively abrupt surface portion and being shaped to automatically carry the cycling disc back into latched connection with said latching elements at about the end of a record changing cycle and to keep the surface in frictional engagement with the driving roller till the abrupt surface portion is brought opposite the roller to cause the surface of the latched disc to be disengaged from the roller.

3. The combination as defined by claim 2 in which the cycling cam disc comprises a generally circular central hub portion and an outer tire portion of varying thickness providing the cam-shaped driven friction surface and held on the central hub portion.

BENJAMIN R. CARSON.

REFERENCES CITED

The following references are of record in the file of this patent:

UNITED STATES PATENTS

| Number | Name | Date |
|---|---|---|
| 1,938,810 | Collison et al. | Dec. 12, 1933 |
| 1,991,005 | Whitman | Feb. 12, 1935 |
| 2,270,415 | Catucci | Jan. 20, 1942 |
| 2,330,293 | Knox | Sept. 28, 1943 |
| 2,331,383 | Faulkner | Oct. 12, 1943 |
| 2,352,331 | Leline | June 27, 1944 |
| 2,373,494 | Noren et al. | Apr. 10, 1945 |
| 2,390,862 | Alexandersson et al. | Dec. 11, 1945 |
| 2,397,932 | Erwood et al. | Apr. 9, 1946 |
| 2,412,441 | Carson et al. | Dec. 10, 1946 |
| 2,426,978 | Alexandersson | Sept. 9, 1947 |
| 2,435,264 | Ansar | Feb. 3, 1948 |